United States Patent
Bran et al.

(10) Patent No.: US 10,911,560 B2
(45) Date of Patent: Feb. 2, 2021

(54) PARTITIONED SERIALIZED CACHING AND DELIVERY OF LARGE FILES

(71) Applicant: Verizon Digital Media Services Inc., Dulles, VA (US)

(72) Inventors: Juan Bran, Los Angeles, CA (US); Derek Shiell, Los Angeles, CA (US)

(73) Assignee: Verizon Digital Media Services Inc., Los Angeles, CA (US)

( * ) Notice: Subject to any disclaimer, the term of this patent is extended or adjusted under 35 U.S.C. 154(b) by 34 days.

(21) Appl. No.: 16/184,363

(22) Filed: Nov. 8, 2018

(65) Prior Publication Data

US 2019/0075182 A1 Mar. 7, 2019

Related U.S. Application Data

(63) Continuation of application No. 14/996,930, filed on Jan. 15, 2016, now Pat. No. 10,129,358.

(51) Int. Cl.
*H04L 29/08* (2006.01)

(52) U.S. Cl.
CPC .......... *H04L 67/2842* (2013.01); *H04L 67/06* (2013.01)

(58) Field of Classification Search
CPC ... H04L 67/02; H04L 65/608; H04L 65/4084; H04L 65/607; H04L 65/80; H04L 65/602; H04L 65/601; H04L 67/42; H04L 65/4076; H04L 67/06; H04L 65/4069; H04L 65/604; H04L 65/605; H04L 65/4092; H04L 65/60; H04L 67/10; H04L 65/00; H04L 12/1881; H04L 1/004; H04L 1/0045; H04L 1/0083; H04L 67/2842; H04L 2012/5682; H04L 47/10; H04L 47/25; H04L 47/70; H04L 67/26; H04L 69/22; H04L 67/2814; H04L 12/18; H04L 12/189; H04L 12/22; H04L 1/1841; H04L 2001/0093; H04L 45/7453; H04L 63/02; H04L 63/126; H04L 63/1416; H04L 63/145; H04L 67/1031; H04L 67/14; H04L 67/145; H04L 69/14; H04L 69/161
See application file for complete search history.

(56) References Cited

U.S. PATENT DOCUMENTS

| | | | |
|---|---|---|---|
| 2004/0117455 A1* | 6/2004 | Kaminsky | H04L 67/42 709/214 |
| 2008/0189429 A1 | 8/2008 | DaCosta | |
| 2011/0264759 A1 | 10/2011 | Perantatos et al. | |

(Continued)

*Primary Examiner* — Djenane M Bayard
(74) *Attorney, Agent, or Firm* — Ansari Katiraei LLP; Arman Katiraei; Sadiq Ansari (57) ABSTRACT

Some embodiments provide partitioned serialized caching and delivery of large sized content and files. Some embodiments partition requests for large sized content into segment requests with each segment request identifying a different byte range of the requested content. Each segment request is hashed to identify a particular server from a set of servers tasked with caching and delivering a different segment of the requested content. In this manner, no single server caches or delivers the entirety of large sized content. The segment requests are distributed serially across the set of servers so that the segments are passed in order, wherein the serial distribution involves handing-off the requesting user's connection serially to each server of the set of server in the order with which the set of servers deliver the content segments.

20 Claims, 7 Drawing Sheets

(56) References Cited

U.S. PATENT DOCUMENTS

| | | | |
|---|---|---|---|
| 2014/0143375 A1* | 5/2014 | Walker | H04L 67/10 |
| | | | 709/217 |
| 2016/0094966 A1 | 3/2016 | Ledingham et al. | |
| 2016/0182671 A1* | 6/2016 | Dakhane | H04L 65/605 |
| | | | 709/219 |
| 2016/0323342 A1 | 11/2016 | Luby et al. | |
| 2016/0381177 A1* | 12/2016 | Minder | H04L 1/004 |
| | | | 709/226 |
| 2017/0201761 A1* | 7/2017 | Walker | H04N 19/46 |
| 2017/0230434 A1* | 8/2017 | Wang | H04L 65/60 |

\* cited by examiner

PARTITIONED SERIALIZED CACHING AND DELIVERY OF LARGE FILES

CLAIM OF BENEFIT TO RELATED APPLICATIONS

This application is a continuation of U.S. non-provisional application Ser. No. 14/996,930, entitled "Partitioned Serialized Caching and Delivery of Large Files", filed Jan. 15, 2016. The contents of application Ser. No. 14/996,930 are hereby incorporated by reference.

BACKGROUND ART

Content file sizes continue to grow as does the complexity and richness of the content being served over digital networks. Large sized content typically includes video, audio, web, gaming, application content, or any content that exceeds a certain file size.

Content delivery networks (CDNs) have adapted to improve the delivery of large sized content. The primary adaptation involves caching popular content in a distributed manner at different points-of-presence (PoP) located at different geographic locations. This allows the CDN to serve the same content to different sets of users from servers in locations that are closest to each set of users. In doing so, the CDN improves content delivery performance by reducing the total number of network hops that content travels in order to reach a user. Caching large sized content does however introduce various challenges with respect to optimizing CDN performance and cache utilization.

Each CDN PoP has a limited cache footprint. The cache footprint limits the amount of content that can be cached at the PoP. Many content servers can be collocated to the same PoP with each such server contributing to the overall cache footprint of the PoP.

A persistent request distribution scheme can be used to maximize the overall cache footprint. Persistent request distribution forwards requests for the same particular content to the same server PoP. As a result, the PoP can cache one copy of content at one particular PoP server knowing that the persistent request distribution scheme will forward all requests for that content to the same particular PoP server. In other words, the persistent request distribution scheme avoids redundantly caching copies of the same content to different servers operating within the same PoP.

Nevertheless, the quantity and increasing size of the content that is to be cached and delivered from each PoP typically exceeds the total cache footprint at a PoP. To maximize the available cache footprint and maximize the request cache-hit ratio, the PoP servers are normally configured to retain copies of the most frequently requested content or the newest content in cache. Stale content or infrequently requested content is removed from cache. However, several inefficiencies result when applying such content caching policies to the caching of large sized content.

One problem with caching large sized content is that several other content or objects may be removed from cache in order to free sufficient memory to cache one instance of the large sized content. This is especially significant when a single server is tasked with caching the entirety of large sized content. For example, a first PoP server may be selected for caching and delivery of a first set of content and a second PoP server may be selected for caching and delivery of a different second set of content. When the first set of content does not include large sized content, the first PoP server may be able to cache all the first set of content and have the content ready for immediate delivery. When the second set of content includes only large sized content, the second PoP server may be limited to caching only a subset of the second set of content. The second PoP server would have to retrieve uncached instances of the second set of content from content origin sites before being able to satisfy requests for such content. This results in a disproportionate cache-hit ratio at the first PoP server relative to the second PoP server and further results in unbalanced server and content delivery performance from the PoP. Specifically, performance of the second PoP server and delivery of the second set of content is degraded relative to the first PoP server and delivery of the first set of content as the second PoP server will have to make more retrievals to content origin sites than the first PoP server because of the limited caching of the second set of content and because the second PoP server storage performs slower write operations than the first PoP server.

Another problem is that caching large sized content makes inefficient use of the available cache. For example, a video file may be four gigabytes in size, yet users may repeatedly request and view only a particular section of the video file. In such cases, the PoP servers cache the entire video file only to serve a small segment from the overall video. In other words, some portion of the cached content may never be served, but must be cached because it is part of the same file.

Yet another problem with caching large sized content is the potential for a single point of a failure. If a single server caches an entire two hour video stream and the server experiences some failure or performance degradation, then the entire two hour video stream becomes unavailable to all users that are routed to that PoP server, even though the users may attempt to watch different segments of the video stream.

Accordingly, there is a need to improve delivery of large sized content. To this end, there is further a need to improve the cacheability and caching of large sized content within a collective cache formed from a set of cooperative and collocated set of servers.

BRIEF DESCRIPTION OF THE DRAWINGS

A preferred embodiment of methods and systems for partitioned serialized caching and delivery of large sized content and files will now be described, by way of example only, with reference to the accompanying drawings in which.

DETAILED DESCRIPTION

Some embodiments provide partitioned serialized caching and delivery of large sized content and files. The partitioned serialized caching and delivery is implemented by a collective cache. The collective cache is formed from a set of cooperative and collocated set of content servers and one or more request management servers. The implementation improves the cacheability of large sized content within the collective cache, which in turn, improves the content delivery performance of the large sized content and other content from the collective cache.

The partitioned serialized caching and delivery involves partitioning requests for large sized content. The partitioning produces several segment requests from an original user request directed to large sized content. The segment requests are directed to different segments of the large sized content with each segment corresponding to a different byte range of the large sized content in some embodiments. The segment requests are distributed to two or more content servers of the collective cache so that the different segments of the large sized content are cached and served by the different content servers. Consequently, no single content server of the collective cache is tasked with caching and delivering an entire instance of large sized content. Moreover, the partitioned serialized caching and delivery enables the caching of certain segments of large sized content without caching all of the large sized content and eliminates a single server from becoming a single point of failure in the delivery of large sized content.

Figure 1:
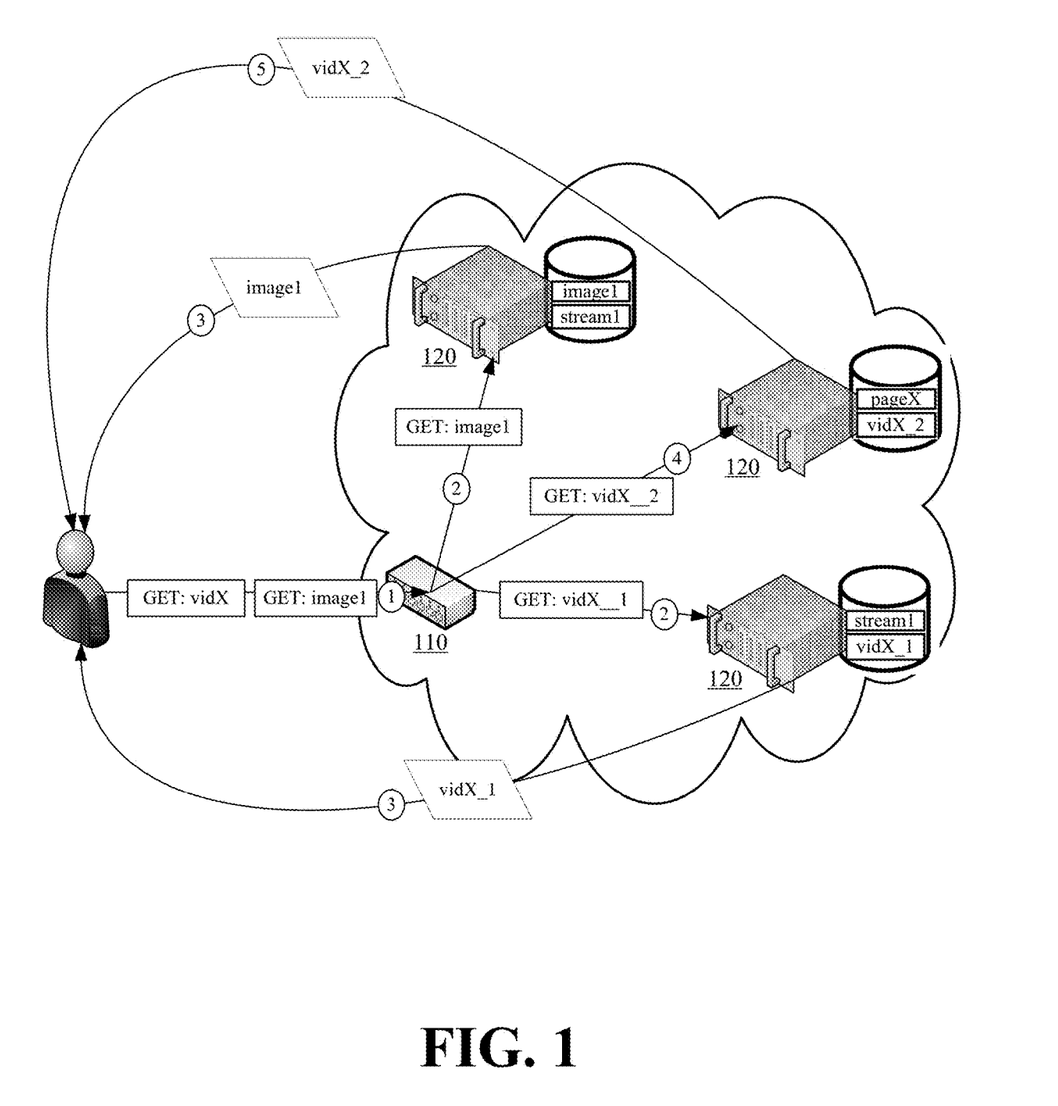
FIG. 1 conceptually illustrates a collective cache implementing the partitioned serialized caching and delivery of large sized content in accordance with some embodiments.

FIG. 1 conceptually illustrates a collective cache implementing the partitioned serialized caching and delivery of large sized content in accordance with some embodiments. The collective cache includes at least one request management server 110 and a set of two or more content servers 120. The collective cache of FIG. 1 can represent a content delivery network (CDN) point-of-presence (PoP), a hosting provider site, a cloud content or service provider, a server farm, or any other set of two or more servers working in collaboration to cache and deliver some set of content.

The request management server 110 receives all user requests for content directed to the collective cache. The requests are typically in the form of HyperText Transfer Protocol (HTTP) GET requests, although the request management server 110 supports requests in other formats passed using other protocols. The request management server 110 represents one or more machines that perform a load balancing function to distribute the user requests across the set of content servers 120. In particular, the request management server 110 performs a persistent request distribution such that the request management server 110 forwards requests for the same first set of content to a first content server of the set of servers 120 and forwards requests for the same second set of content to a different second content server of the set of servers 120. In some embodiments, the request management server 110 selects a content server of the collective cache to receive a user request based on a hash of a Uniform Resource Locator (URL) or other identifier within the user request, wherein the URL identifies the content being requested. In some embodiments, the content server selection is based on a hash of source or destination addressing included as part of the user request header. Although the hashes represent preferred embodiments for performing the persistent request distribution, other embodiments may employ other means to persistently distribute the user requests across the collective cache content servers.

Prior to distributing a request to one of the content servers 120, the request management server 110 determines if the request is for large sized content. In some embodiments, the request management server 110 is configured with a list of large sized content. In some such embodiments, the request management server 110 performs a lookup of the request URL against the configured list. A request for large sized content is identified when the request URL matches to an entry in the configured list. In some other embodiments, the request management server 110 performs a query to obtain the size of the requested content or file. In some embodiments, the query involves sending a head request from the request management server 110 to the origin server that stores the requested content or file. In some such embodiments, the origin server responds to the head request by returning a header of the requested content or file without the message body. From the returned header, the request management server 110 can determine the content or file size. In some embodiments, the request management server 110 performs a query against an internal database or the content servers in order to obtain the content or file size.

The request management server 110 compares the obtained size against a configured file size threshold. The file size threshold defines what constitutes large sized content within the collective cache. Some embodiments configure the request management server 110 with a single file size threshold from which all large sized content is identified. Some other embodiments configure the request management server 110 with several file size thresholds. In some such embodiments, the request management server 110 can use a different file size threshold in classifying content of different content providers as regular sized or large sized content. For instance, the request management server may be configured with a first file size threshold for defining a first content provider's content as large sized content when the content exceeds one gigabyte and a second file threshold for defining a different second content provider's content as large sized content when the content exceeds four gigabytes.

Upon identifying a request for large sized content, the request management server 110 partitions the request into two or more segment requests with each segment request requesting a different segment of the large sized content. The segments represent non-overlapping sequential byte ranges of the large sized content. In some embodiments, the request management server 110 is configured with a segment stripe size. The request management server 110 determines the byte ranges for each segment based on the segment stripe size.

The request management server 110 hashes each segment request in a serialized fashion to identify the content server from the set of content servers 120 that is tasked with caching and delivering the particular large sized content segment identified by the segment request. In some embodiments, segment request hashing involves hashing the original request URL in conjunction with the byte range of the segment request. As part of the serialized distribution of the segment requests, the request management server 110 hashes a first segment request, identifies a first content server from the collective cache tasked with the caching and distribution of the first segment, forwards the first segment request to the first content server, and awaits confirmation from the first content server that the first segment has been mostly or fully served before repeating the process for a second segment request and subsequent segment requests partitioned from the original user request.

In some embodiments, the request management server 110 initiates prefetching of all of segments by passing the partitioned segment requests to the respective content servers at the same time to cause the content servers to retrieve the corresponding segments from the origin server when the segments are not already cached or an obsolete segment is cached, wherein the obsolete segment can be identified from a time-to-live (TTL) parameter associated with the cached segment. The segment requests can be modified with a flag that causes the content servers to retrieve the identified segments without passing them to the requesting user. The request management server 110 then manages the sequential delivery of the segments to the requesting user by sending a second set of the segment requests to the respective content servers in a serialized manner without setting the flag in the requests.

The set of content servers 120 collectively perform the content caching and delivery function for large sized content. Each content server of the set of content servers 120 has memory used for caching entire content or content segments. The content cached by a particular server of the set of content servers 120 is determined from the requests that the request management server 110 forwards to the particular server. A content server retrieves, caches, and delivers a particular byte range of content, as opposed to the entire content, in response to a received segment request specifying that particular byte range of content. A content server retrieves, caches, and delivers all of a requested file or content if the request received from the request management server 110 does not specify a byte range.

If a content server receives a segment request for a segment that is already in cache, the segment is served from the cached copy without retrieving the content from an origin server. If a requested segment is not cached or an obsolete copy is cached, the content server issues the segment request or a byte range request for the specified segment to the origin server. The origin server is a server outside the collective cache where original and updated copies of the content are available. The origin server is typically under the control of a content provider and is the source from where the collective cache content servers or other content delivery network servers obtain copies of content for redistribution to end users. Generally, the origin server is a source for content redistributed by the collective cache content servers. The content server retrieves the segment from the origin server, forwards the segment to the requesting user, and optionally caches the segment. If the content server cache is full and a segment is to be cached, the content server will select certain content or objects to flush from cache according to configured caching policies in order to free sufficient space to cache the retrieved segment.

Figure 2:
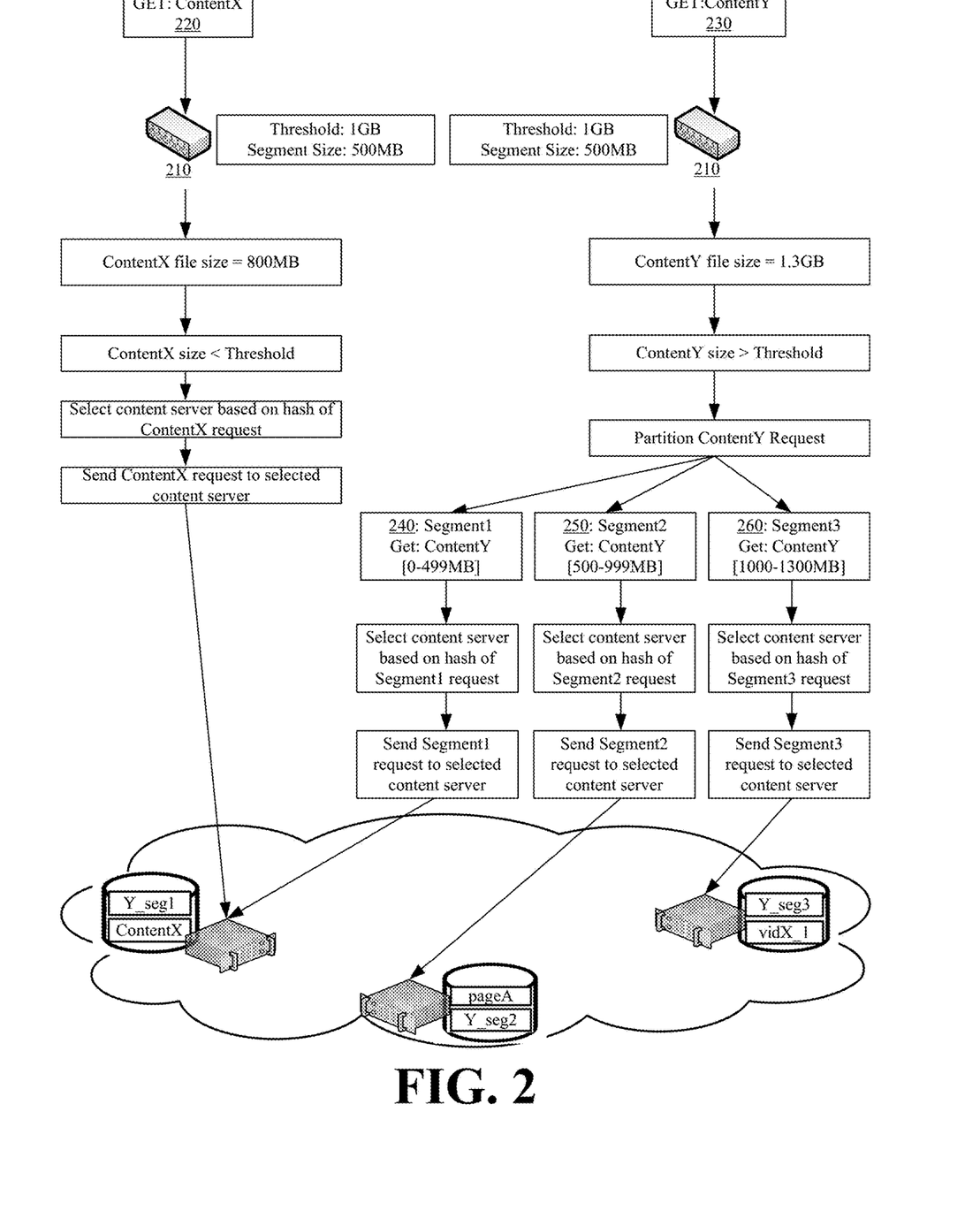
FIG. 2 conceptually illustrates a request management server identifying a request for large sized content and partitioning the request into segment requests according to a configured file size threshold and segment stripe size.

FIG. 2 conceptually illustrates a request management server identifying a request for large sized content and partitioning the request into segment requests according to a configured file size threshold and segment stripe size. The figure illustrates a request management server 210, a first request 220 for first content, and a second request 230 for second content. In this figure, the request management server 210 is configured with a file size threshold of one gigabyte and a segment stripe size of 500 megabytes.

The request management server 210 receives the first request 220. The request management server 210 obtains a size of the file or content requested in the first request 220 by issuing a head request or by other means. The request management server 210 determines that the first content requested in the first request 220 is 800 megabytes in size. The first content file size is less than the configured one gigabyte file size threshold. Accordingly, the request management server 210 does not partition the first request 220. The request management server 210 hashes the request to select a content server from the set of content servers of the collective cache that is tasked with caching and delivering the entirety of the first content.

The request management server 210 receives the second request 230. Here again, the request management server 210 obtains the size of the file or content requested in the second request 230 and determines the second content requested in the second request 230 is 1.3 gigabytes in size. The second content file size is greater than the configured one gigabyte file size threshold. Accordingly, the request management server 210 partitions the second request 230. In partitioning the second request 230, the request management server 210 generates three segment requests 240, 250, and 260 according to the configured segment stripe size.

In accordance with some embodiments, the request management server 210 generates each of the segment requests 240, 250, and 260 according to the Internet Engineering Task Force (IETF) Request for Comment (RFC) 7233 entitled "Hypertext Transfer Protocol (HTTP/1.1): Range Requests". In particular, the request management server 210 replicates the original HTTP request packet for each segment request 240, 250, and 260 and inserts the different byte range for each segment into the range request header field of the HTTP packet. The request management server 210 specifies the first 500 megabytes of the second content (i.e., megabytes 0-499) in the range request header field of the first segment request 240, specifies the second 500 megabytes of the second content (i.e., megabytes 500-999) in the range request header field of the second segment request 250, and specifies the last 300 megabytes of the second content (i.e., megabytes 1,000-1,300) in the range request header field of the third segment request 260. Other embodiments may use different methodologies to generate the segment requests including, for example, appending the partitioned segment stripe size byte range to the URL used in requesting the second content.

As noted above, the request management server 210 distributes the segment requests to different content servers of the collective cache in a serialized manner. The serialized distribution ensures that the content servers process and respond to the segment requests sequentially and in order so that the requesting user receives the content in sequence, which is especially important when the content involves streaming video or audio. In some embodiments, this serialized distribution of segment requests is complicated by virtue of the request management server and the set of content servers sharing an established connection with the user, rather than each content server establishing a new connection with the user and serving each of the segments over different connections.

Figure 3:
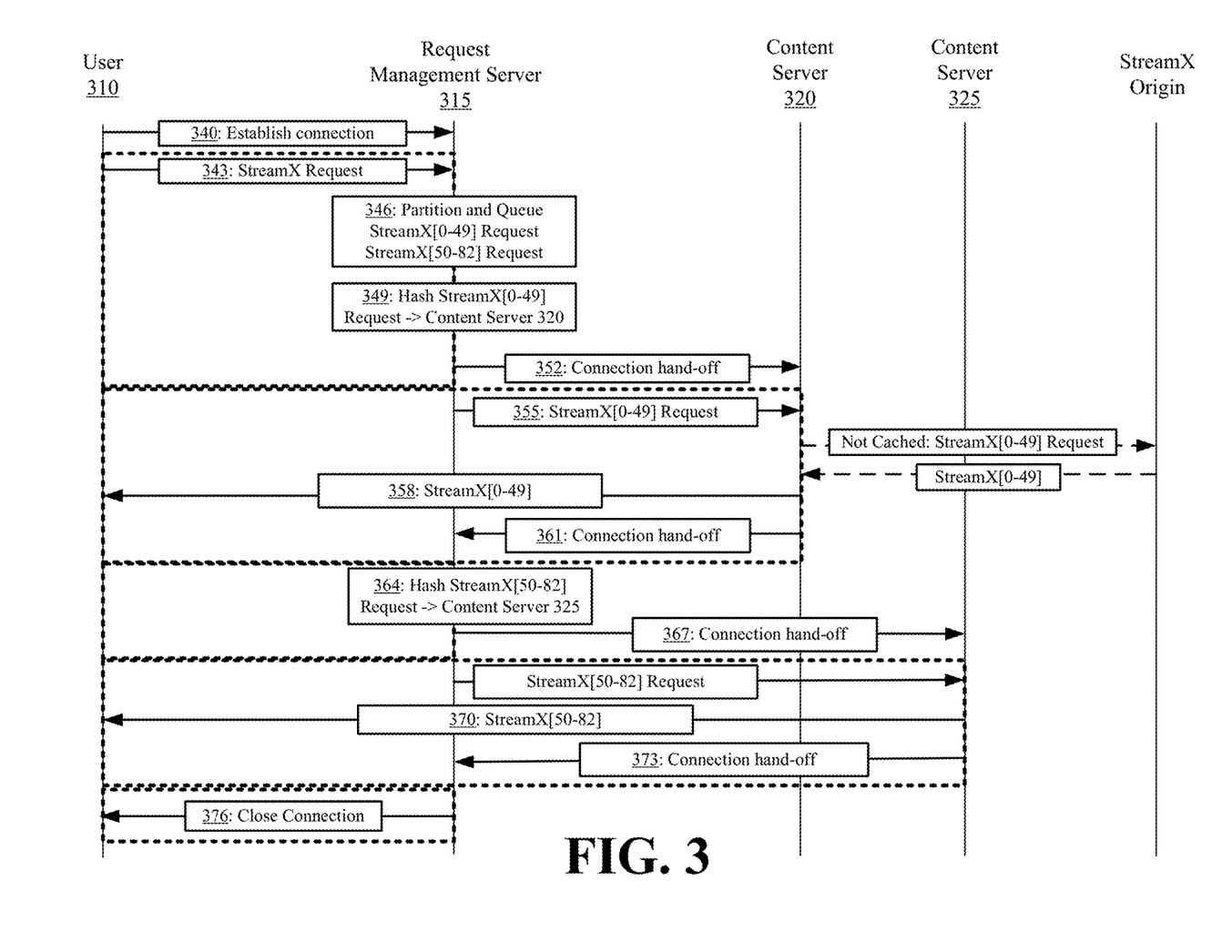
FIG. 3 illustrates performing serialized distribution of segment requests through a sequence of connection hand-offs in accordance with some embodiments.

FIG. 3 illustrates performing serialized distribution of segment requests through a sequence of connection handoffs in accordance with some embodiments. The figure illustrates message exchanges between a content requesting user 310, request management server 315, and content servers 320 and 325.

The user 310 establishes (at 340) a connection with the request management server 315 prior to submitting a content request. The connection can be established according to the procedure of any connection-oriented protocol. In preferred embodiments, the Transmission Control Protocol (TCP) three-way handshake is used to establish a connection between the user 310 and the request management server 315. Establishing the connection includes initializing communication parameters for the connection including, for example, a TCP window size and sequence number.

Once the connection is established, the user 310 sends (at 343) the content request to the request management server 315. The content request includes the URL identifying the content being requested. By obtaining the requested content size, the request management server 315 determines that the request is for large sized content. In this figure, the request management server 315 generates two segment requests to request the two partitioned segments of the requested content. Each segment request is formed from the original request modified to include a byte range in the header for the specific segment. The request management server 315 queues (at 346) the segment requests in order.

The request management server 315 hashes (at 349) the first segment request to identify the first server 320 as the collective cache content server tasked with caching and delivery of the first segment. In order to allow the first server 320 to respond to the user 310 with the first content segment, the request management server 315 hands-off (at 352) the connection to the first server 320. To perform the connection hand-off, the request management server 315 generates a packet that contains parameters for the current connection state. For example, the packet identifies the current TCP sequence number, window size, etc. The request management server 315 sends the connection hand-off packet to the first server 320 along with the first segment request. The first server 320 then terminates the connection with the user 310. A specific connection hand-off procedure that can be used with the partitioned serialized caching and delivery embodiments is provided by U.S. Pat. No. 8,688,817, the contents of which are incorporated herein by reference.

The first server 320 sends (at 355) the first content segment to the user 310 over the handed-off connection. The first server 320 sends the first content segment from a cached copy if one is available. Otherwise, the first server 320 retrieves the first content segment from an origin site before passing (at 358) the segment to the user 310 over the handed-off connection and optionally, caching the segment at the first server 320.

The first server 320 signals the request management server 315 when the transfer is complete by handing (at 361) the connection back to the request management server 315. To do so, the first server 320 generates a connection hand-off packet and sends the packet to the request management server 315. The packet may include the adjusted parameters for the current connection state including an updated TCP sequence number for example.

Upon receiving the connection back from the first server 320, the request management server 315 identifies the next segment request that is queued for the connection. The request management server 315 hashes (at 364) the second segment request, identifies the second server 325 as the collective cache content server tasked with caching and delivery of the second segment, and hands-off (at 367) the connection with the second segment request to the second server 325 using the same hand-off procedure. The second server 325 sends (at 370) the second content segment to the user 310 over the handed-off connection and returns (at 373) the connection back to the request management server 315 upon completing the second content segment transfer to the user 310. The request management server 315 closes (at 376) the connection with the user 310 upon identifying that the content has been fully served and no additional segments remain.

The handing-off of the connection between the request management server 315 and the content servers 320 and 325 can be disguised by having each of the servers use a shared collective cache address in communications with the user 310. The user 310 therefore sees all the content coming from the shared address without knowing that different servers are involved. The request management server 315 correctly forwards packet acknowledgements and other messaging from the user 310 to the proper content server by identifying the connection endpoint based on addressing from the user's 310 packets and/or the content that is implicated. Internal communications between the servers 315-325 can be performed using unique addressing assigned to each of the servers.

Serialized delivery of the content segments can also be achieved with the request management server creating new connections to the content servers to bridge the connection back to the user. In some such embodiments, the request management server maintains the connection established with the user. The request management server then establishes a first new connection with the first content server. Over the first new connection, the request management servers sends the first segment request to the first content server and receives the first segment from the first content server which the request management server then forwards back over the established connection to the user. The request management server terminates the connection with the first content server once the first segment is sent. Towards the end of sending the first segment, the request management server establishes a second new connection with the second content server. Over the second new connection, the request management servers sends the second segment request to the second content server and receives the second segment from the second content server which the request management server then forwards back over the established connection to the user. The request management server continues establishing and terminating connections with the content servers in the serialized manner until all segments of the requested content are passed to the user.

Figure 4:
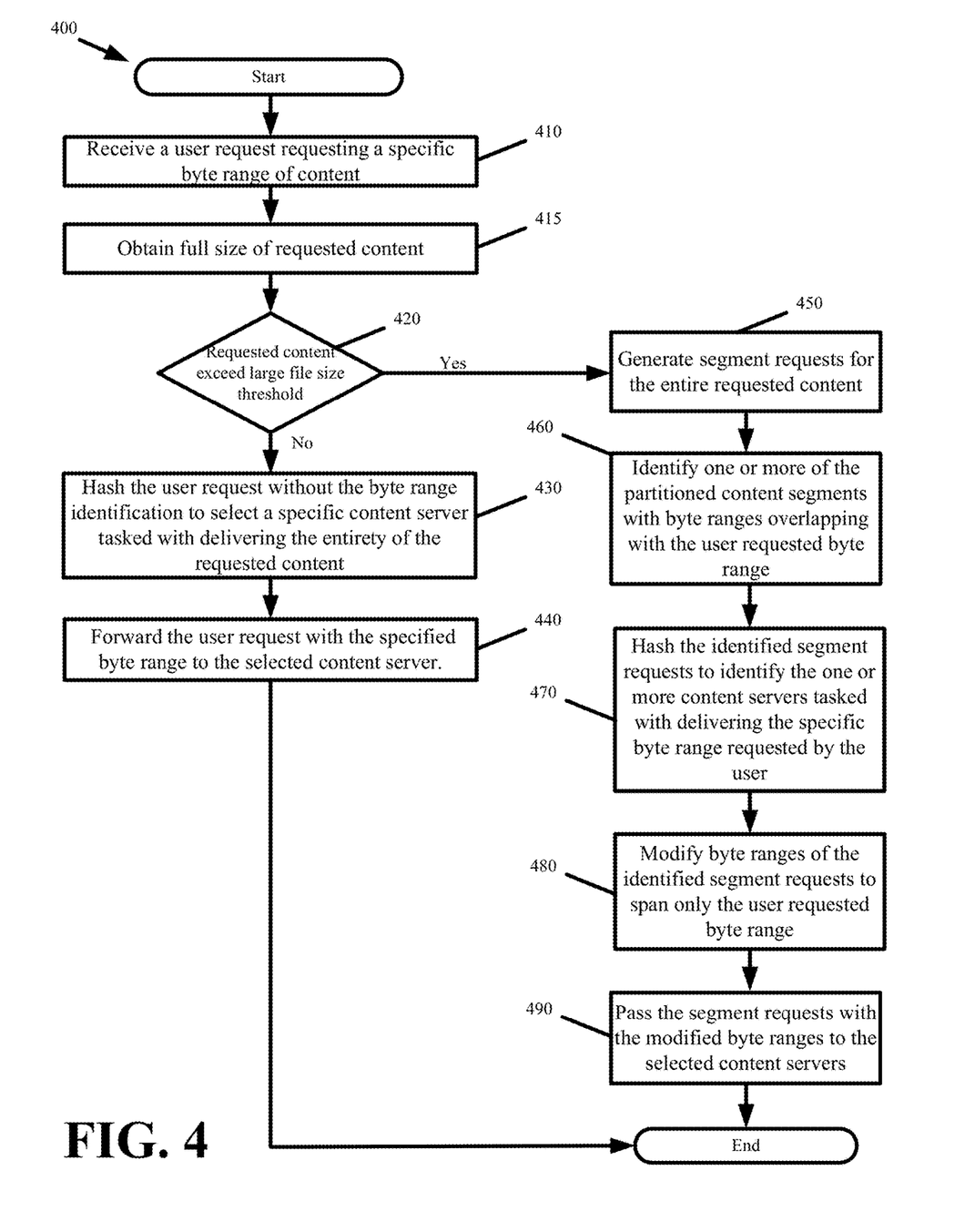
FIG. 4 presents a process 400 describing the special range handling functionality performed by the request management server for user requests specifying byte ranges spanning multiple large sized content segments in accordance with some embodiments.

Some embodiments provide special range handling functionality to adapt the partitioned and serialized caching and delivery operation for user requests requesting byte ranges of large sized content that span different portions of different segments. FIG. 4 presents a process 400 describing the special range handling functionality performed by the request management server for user requests specifying byte ranges spanning multiple large sized content segments in accordance with some embodiments.

Process 400 commences with the request management server receiving (at 410) a user request requesting a specific byte range of content. The process obtains (at 415) the full size of the requested content by performing a content size lookup. As noted above, the content size lookup can be performed by issuing a head request or by querying an internal database or the content servers. The process then determines (at 420) whether the size exceeds the large file size threshold.

In response to the requested content size not exceeding the large file size threshold, the process hashes (at 430) the user request without the byte range identification in order to select a specific content server tasked with caching and delivering the entirety of the requested content. The process then forwards (at 440) the user request with the specified byte range to the selected content server. In some embodiments, the request management server forwards the user request with the specified byte range as part of handing-off the connection established with the user to the selected content server. The content server responds to the user request by submitting only the requested byte range from a cached copy of the entire requested content. If the entire requested content is not cached or an obsolete copy is cached, the content server retrieves the entire requested content from an origin server or retrieves the requested byte range by passing the original user request with the specified byte range to the origin server. The process ends.

In response to the requested content size exceeding the large file size threshold, the process generates (at 450) the segment requests for the entire requested content. The generated segment requests do not span the specific byte ranges requested by the user, because they identify byte ranges corresponding to the partitioned content segments that may be cached by the content servers. The process then identifies (at 460) one or more of the partitioned content segments that specify byte ranges overlapping with the user requested byte range.

According to the serialized segment request distribution referenced in FIG. 3, the process hashes (at 470) the identified segment requests to identify the one or more content servers tasked with delivering the specific byte range that is requested by the user and modifies (at 480) the byte ranges of the segment requests to span only the user requested byte range before passing (at 490) the segment requests with the modified byte ranges to the selected content servers. The selected content servers then respond to the modified segment requests by sending the requesting user the content byte range originally requested the user.

Figure 5:
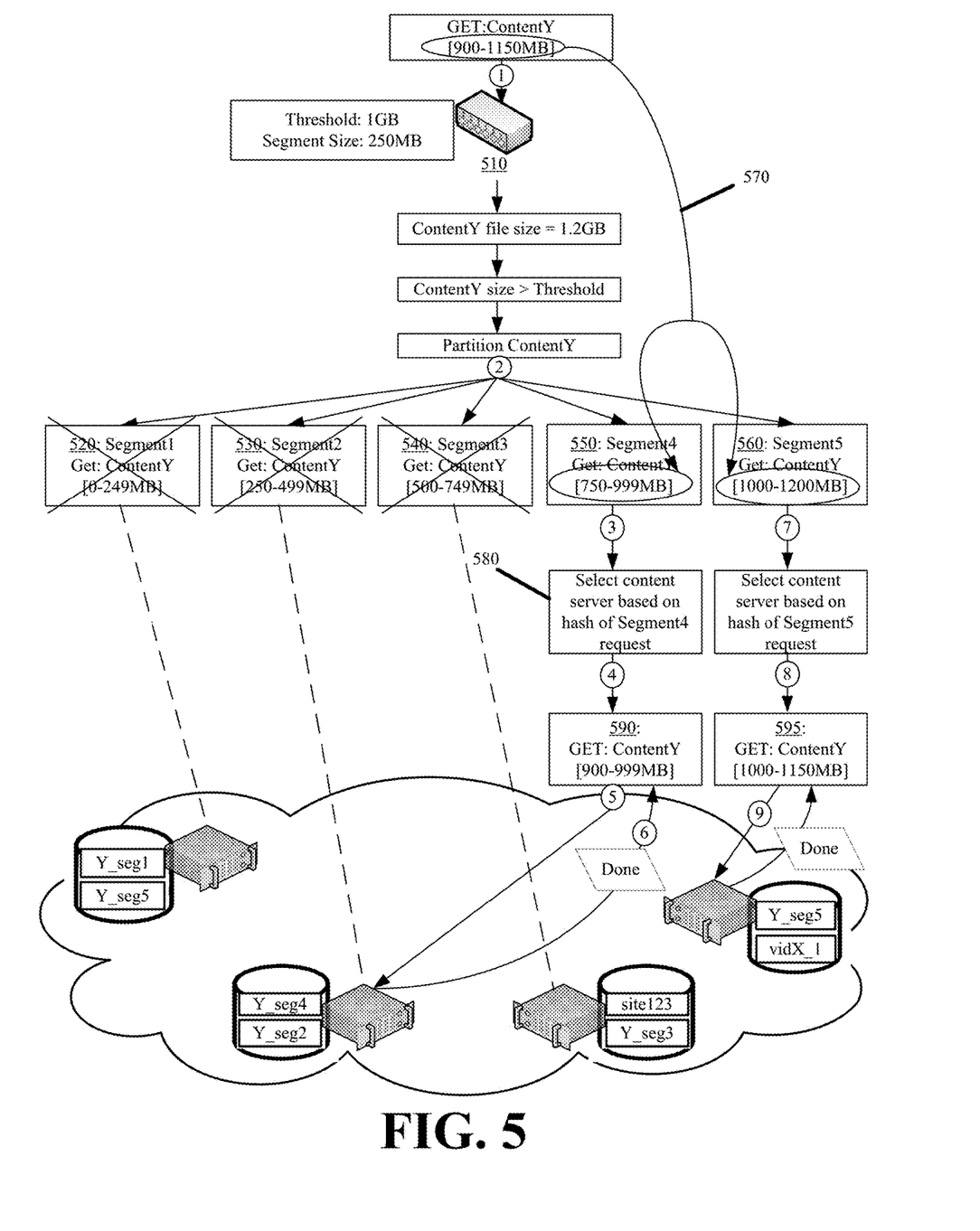
FIG. 5 conceptually illustrates the special range handling operation of the request management server in accordance with some embodiments.

FIG. 5 conceptually illustrates the special range handling operation of the request management server in accordance with some embodiments. In this figure, a request management server 510 receives a user request for megabyte range 900-1150 of contentY. The request management server performs a lookup of contentY to determine that the requested content exceeds a configured large file size threshold of 1000 megabytes. Accordingly, the request management server generates five segment requests 520, 530, 540, 550, and 560 for contentY based on stripe segment sizes of 250 megabytes. Specifically, the request management server generates a first segment request 520 for megabyte range 0-249, a second segment request 530 for megabyte range 250-499, a third segment request 540 for megabyte range 500-749, a fourth segment request 550 for megabyte range 750-999, and a fifth segment request 560 for megabyte range 1000-1200.

As shown at 570, the request management server 510 identifies that the user requested megabyte range falls within the fourth segment request 550 megabyte range and the fifth segment request 560 megabyte range. The request management server 510 therefore queues the fourth and fifth segment requests 550 and 560 while discarding the other segment requests 520, 530, and 540.

Next, the request management server 510 hashes (at 580) the fourth segment request 550 to identify a first content server of the collective cache content servers tasked with caching and delivering the fourth segment covering megabyte range 750-999. The user request does not however specify this entire byte range. Accordingly, the request management server 510 produces a modified fourth segment request 590 by modifying the megabyte range in the fourth segment request 550 to specify the range that overlaps with the user requested byte range. In particular, the request management server 510 modifies the fourth segment request 550 to specify the megabyte range 900-999 which overlaps with the fourth segment megabyte range of 750-999 and the user requested megabyte range of 900-1150. The request management server 510 passes the modified fourth segment request 590 to the first content server. The first content server responds with only the specified and overlapping megabyte range of 900-999 even though it may have cached or retrieved the entire fourth segment covering megabyte range 750-999. The first server can signal completion of sending the requested fourth segment by returning the connection back established with the requesting user back to the request management server 510.

The request management server 510 proceeds through the queue to select the fifth segment request 560. The request management server 510 hashes the fifth segment request 560 to identify a second content server of the collective cache content servers tasked with caching and delivery of the fifth segment covering megabyte range 1000-1200. Here again, the user request does not specify the entire megabyte range of the fifth segment. Therefore, the request management server 510 produces the modified fifth segment request 595 by modifying the byte range in the fifth segment request 560 to specify the range that overlaps with the user requested megabyte range. In particular, the request management server 510 modifies the fifth segment request 560 to specify the megabyte range 1000-1150 which overlaps with the fifth segment megabyte range of 1000-1200 and the user request byte range of 900-1150. The request management server 510 passes the modified fifth segment request 595 to the second content server. The second content server responds with only the specified and overlapping megabyte range of 1000-1150 before signaling the request management server 510 that the fifth segment is sent, and optionally returning the connection back to the request management server so that the request management server 510 can terminate the connection with the user.

To facilitate the partitioned serialized caching and delivery of large sized content in the above embodiments, the origin server should support the segmented delivery of the large sized content to the collective cache content servers. The origin server can support the segmented delivery by supporting byte range requests from the content servers. In this case, the origin server can store large sized content as a single continuous non-segmented file. The origin server can signal its support for byte range requests using the Accept-Ranges response header. The origin server can also support the segmented delivery by storing large sized content as multiple files with each file representing a different segment of the content partitioned according to the segment stripe size configured within the collective cache. In this case, the collective cache content servers can merely forward the segment requests from the request management server to the origin site in order to retrieve segments that are not stored in content server cache.

Figure 6:
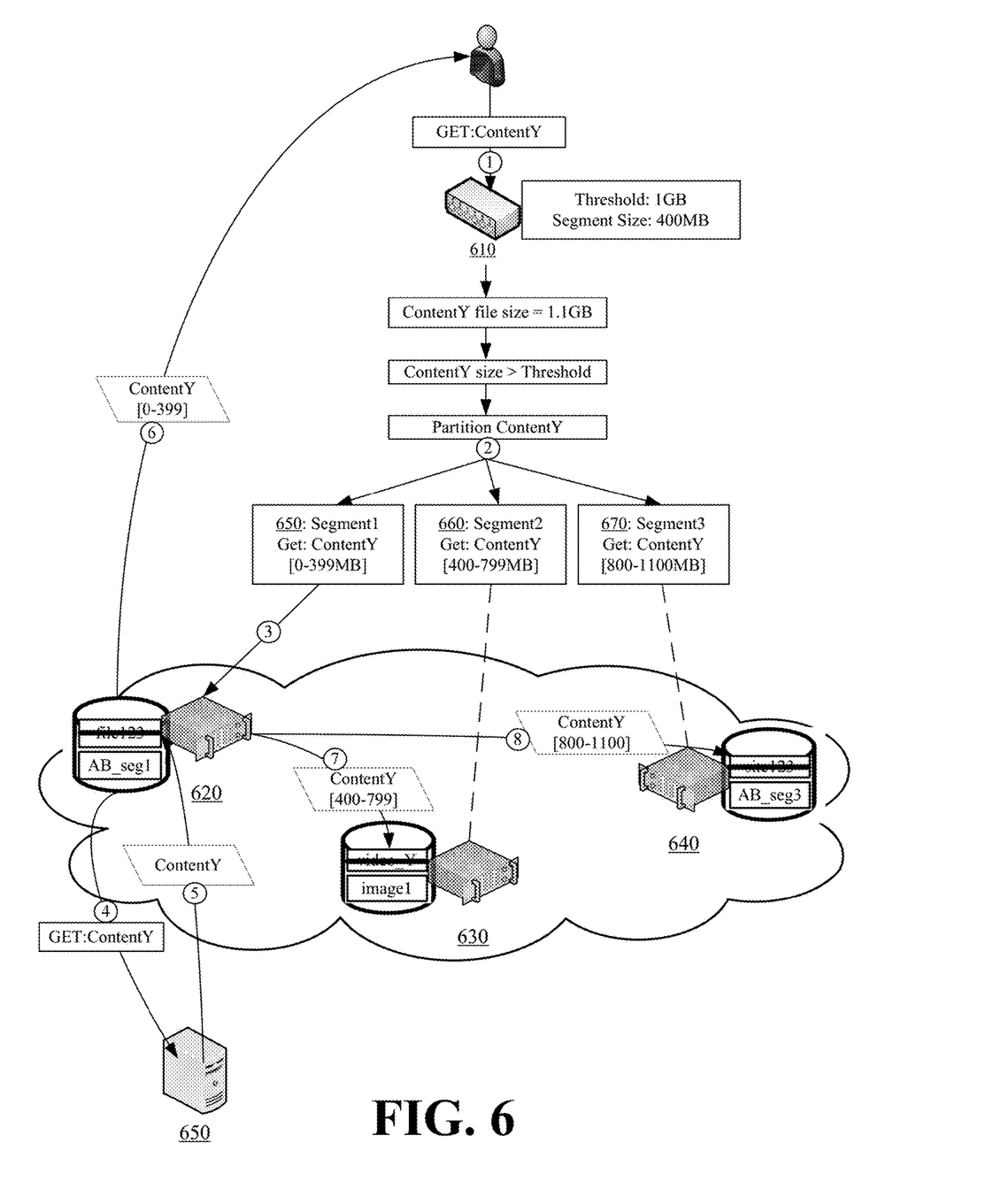
FIG. 6 illustrates partitioned serialized caching and delivery of large sized content and files when origin servers do not support byte range request in accordance with some embodiments.

Additional embodiments are provided when one or more origin servers do not support byte range requests or segmented delivery of large sized content. FIG. 6 illustrates partitioned serialized caching and delivery of large sized content and files when origin servers do not support byte range request in accordance with some embodiments. The figure illustrates operation of a request management server 610 and collective cache content servers 620, 630, and 640 that support byte range requests and an origin server 650 that does not support byte range requests.

The request management server 610 receives a request for large sized content. As before, the request management server 610 partitions the request into several segment requests, with each segment request requesting a different segment of the large sized content rather than the entirety of the large sized content. In this figure, the request management server 610 partitions the received request into three segment requests 660, 670, and 680 with each segment request hashing to identify a different server of the collective cache that is tasked with delivery of the corresponding segment. The request management server 610 hashes the first segment request 660 and selects the first content server 620 to deliver the first segment.

The first content server 620 receives the first segment request 660 from the request management server 610. The requested segment is not cached by the first content server 620. The first content server 620 submits a request for the entire large sized content to the origin server 650 because the origin server 650 does not support byte range requests. The lack of byte range support from the origin server 650 can be determined in advance from the Accept-Ranges header field in messaging from the origin server 650.

The origin server 650 responds by sending the entire content to the first content server 620. In some embodiments, the first content server 620 begins responding to the first segment request 650 as soon as it receives the first set of packets from the origin server 650. In some embodiments, the first content server 620 responds to the first segment request 650 upon receiving all bytes of the content that fall within the byte range of the first segment request 650. The first content server 620 also caches the packets it receives from the origin server 650. As part of caching the content, the first content server 620 partitions the content according to a configured segment strip size (same as may be configured to the request management server 610), wherein the segment stripe size defines the byte ranges for each of the partitioned segments.

Once the first content server 620 receives all bytes for a segment, the server 620 determines which of the content servers 620-640 is tasked with caching and serving that particular segment. To select the correct server, the first content server 620 may pass the segment or a request for that segment to the request management server 650 which then performs the hash to identify the appropriate server. The first content server 620 may itself perform the hash to identify the correct servers and pass the segments to those servers for caching.

The first content server 620 notifies the request management server 610 when it has completed serving the first segment in response to the first segment request 650 so that the request management server 610 can then issue the second segment request 660 to the appropriate second content server 630. Delays or signaling may be introduced to ensure that the second and subsequent collective cache servers are notified or receive the partitioned segments from the first content server 620 before receiving the segment requests.

Any of the content servers can perform the entire content retrieval, partitioning, and redistribution. For instance, it may be that the first collective cache server has the first segment in cache and can respond to the first segment request. However, the second content server may not have the second segment in cache and may therefore initiate retrieval of the entire content, partition the content, and redistribute the content segments to the appropriate content servers.

Some embodiments utilize a cache key to ensure that the segments being served from the content servers are derived from the same version of content. In other words, the cache key ensures that the different collective cache content servers do not pass segments for different versions of the content to the requestor.

In some embodiments, the cache key for each segment comprises the segment byte range and an entity tag (ETag) or other identifier. The ETag identifies the content version from which the cached segment is produced. The ETag can be obtained directly from the origin server or content provider. Alternatively, the ETag can be a derived value formed from a hash or other processing of one or more parameters associated with the content including, for example, a timestamp of the content at the origin site.

After a first content server passes a cached copy of a first segment in response to a first segment request, the first content server returns the ETag associated with the first segment to the request management server. The request management server forwards the first segment ETag along with a second segment request to a second content server. The second content server uses the first segment ETag to ensure that the second segment it sends to the user is obtained from the same content version as the first segment sent by the first content server. If the second segment with the same ETag as the first segment passed by the first content server cannot be obtained by the second content server, either from cache or from the origin server, the second content server can submit a message to the requesting user indicating that the content has changed and the request should be reissued for the new content. It should be noted that in some embodiments the ETags are leveraged to allow the content servers to cache different versions of the same segment such that requests for older versions can be satisfied at the same time as requests for newer versions.

Other ways to manage the content versioning is with the request management server. The request management server can send all segment requests with an ETag selected by the request management server. The request management server can ensure that the ETag for the most recent content version is passed. This ensures that the first selected content server does not serve an obsolete version, which could then force the other content servers to continue passing the obsolete version.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 7:
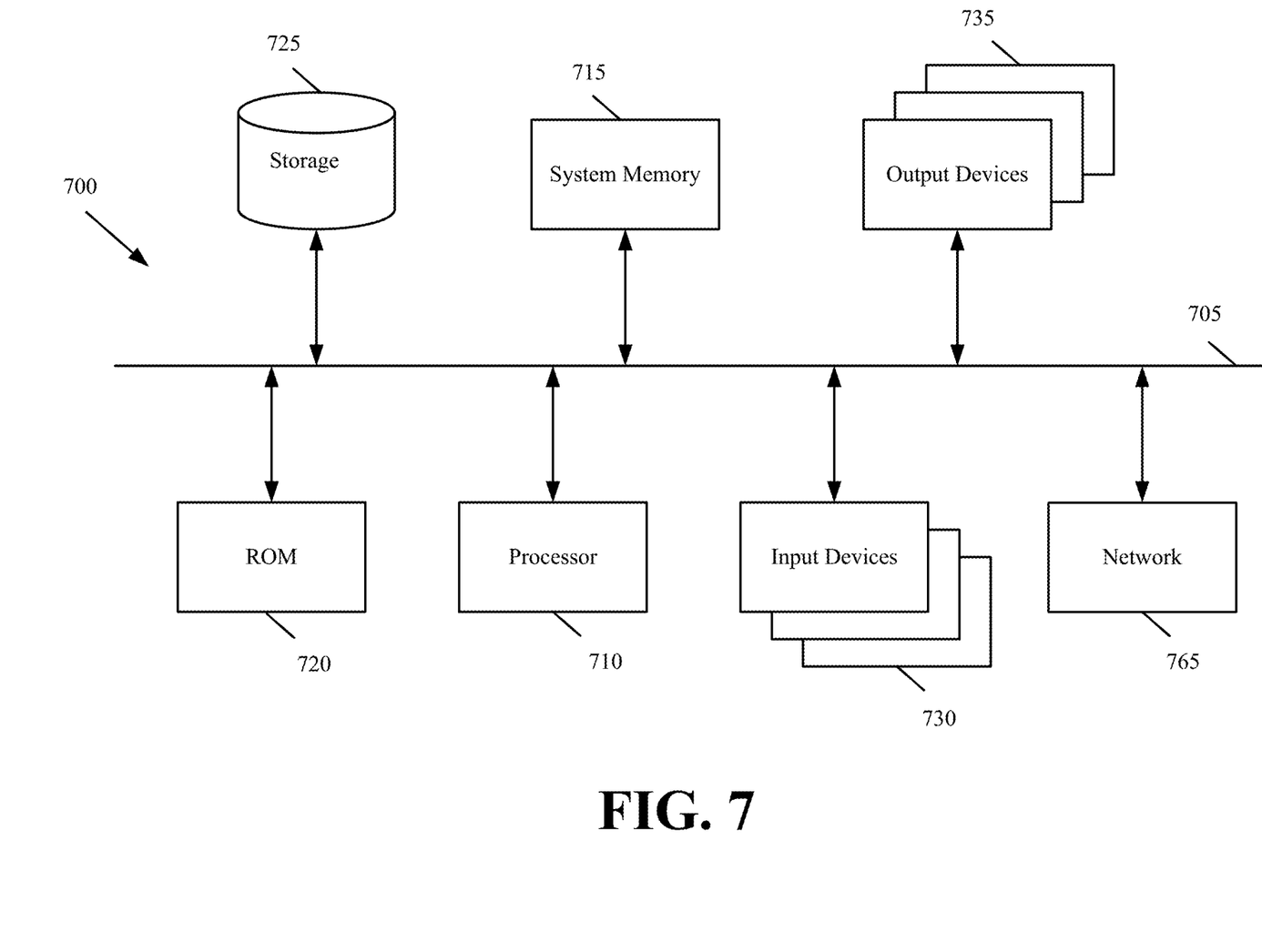
FIG. 7 illustrates a computer system or server with which some embodiments are implemented.

FIG. 7 illustrates a computer system or server with which some embodiments are implemented. Such a computer system includes various types of computer-readable mediums and interfaces for various other types of computer-readable mediums that implement the various methods and machines described above (e.g., request management server and collective cache content servers). Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 725.

Other embodiments use a removable storage device (such as a flash drive) as the permanent storage device Like the permanent storage device 725, the system memory 715 is a read-and-write memory device. However, unlike storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include alphanumeric keypads (including physical keyboards and touchscreen keyboards), pointing devices. The input devices 730 also include audio input devices (e.g., microphones, MIDI musical instruments, etc.). The output devices 735 display images generated by the computer system. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
receiving, from a client device at a request management server, a client request directed to a file, wherein the client request does not specify a byte range;
generating, from the client request at the request management server, a first subrequest directed to a first byte range of the file, and a second subrequest directed to a second byte range of the file that does not overlap with the first byte range, wherein the first subrequest and the second subrequest comprise at least one of a different header or Uniform Resource Locator (URL) than the client request received from the client device;
distributing (i) the first subrequest, instead of the client request, from the request management server to a first server of a set of servers in a common site with the request management server, and the second subrequest, instead of the client request, from the request management server to a second server of the set of servers;
serving the first byte range of the file to the client device from the first server in response to said distributing of the first subrequest; and
serving the second byte range of the file to the client device from the second server in response to said distributing of the second subrequest.

2. The method of claim 1 further comprising determining that a size of the file exceeds a size threshold.

3. The method of claim 2 further comprising caching the first byte range of the file at the first server, and the second byte range of the file at the second server in response to the size of the file exceeding the size threshold, wherein the first server and the second server preserve storage by caching mutually exclusive and different parts of the file.

4. The method of claim 2 further comprising selecting the first server to serve the first byte range based on the size of the file exceeding the size threshold and a result of hashing an identifier identifying the file and the first byte range, and selecting the second server to serve the second byte range based on the size of the file exceeding the size threshold and a result of hashing the identifier identifying the file and the second byte range.

5. The method of claim 1, wherein the first subrequest specifies the first byte range in a range request HyperText Transfer Protocol (HTTP) header field of a first request message, and the second subrequest specifies the second byte range in the range request HTTP header field of a second request message.

6. The method of claim 1 further comprising routing the client request from the client device to the request management server based on a hash of an identifier identifying the file, routing the first subrequest from the request management server to the first server based on a hash of the identifier and the first byte range, and routing the second subrequest from the request management server to the second server based on a hash of the identifier and the second byte range.

7. The method of claim 1 further comprising obtaining a size of the file in response to receiving the client request from the client device.

8. The method of claim 7, wherein obtaining the size comprises issuing a head request from the request management to an origin server that stores said file, and receiving the size without contents of the file from the origin server in response to the head request.

9. The method of claim 7, wherein obtaining the size comprises performing a lookup of the size based on an identifier identifying the file in the client request, and identifying the size based on the lookup.

10. The method of claim 7 further comprising partitioning the client request into at least the first and second subrequests based on the size of the file exceeding a size threshold.

11. The method of claim 10, wherein said partitioning comprises setting the first byte range to span a first number of bytes equal to a segment stripe size, and setting the second byte range to span a second number of bytes that immediately follow the first number of bytes and that equal the segment stripe size.

12. The method of claim 1, wherein said generating comprises appending the first byte range to a URL of the first subrequest, and appending the second byte range to a URL of the second subrequest.

13. A method comprising:
receiving, from a client device, a client request directed to a first byte range of a file;
generating, from the client request, a first subrequest with a second byte range starting at a first byte of the first byte range and ending at a last byte that is before a last byte of the first byte range, wherein the first subrequest comprises at least one of a different header or Uniform Resource Locator (URL) than the client request received from the client device;
generating, from the client request, a second subrequest with a third byte range starting at a byte after the last byte of the second byte range and ending at the last byte of the first byte range, wherein the second subrequest comprises at least one of a different header or URL than the client request and the first subrequest;
distributing (i) the first subrequest, instead of the client request, to a first server of a set of servers, and (ii) the second subrequest, instead of the client request, to a second server of the set of servers;
serving the second byte range of the file to the client device directly from the first server in response to said distributing of the first subrequest; and
serving the third byte range of the file to the client device directly from the second server in response to said distributing of the second subrequest, wherein the second server is different than the first server.

14. The method of claim 13 further comprising determining that the first byte range is larger than a segment stripe size for cached segments of the particular file, and partitioning the request into at least the first subrequest and the second subrequest based on said determining.

15. The method of claim 13 further comprising routing the first subrequest to the first server based on hashing an identifier and the second byte range of the first subrequest, and routing the second subrequest to the second server based on hashing the identifier and the third byte range of the second subrequest.

16. The method of claim 13, wherein said generating the first subrequest comprises setting a first byte of the second byte range to coincide with the first byte of the first byte range, and setting a last byte of the second byte range to span a segment stripe size from the first byte of the second byte range.

17. The method of claim 13 further comprising caching the second byte range of the file at the first server, and caching the third byte range of the file at the second server.

18. The method of claim 13, wherein the first subrequest specifies the second byte range in a range request HyperText Transfer Protocol (HTTP) header field, and the second subrequest specifies the third byte range in the range request HTTP header field.

19. The method of claim 13, wherein the first subrequest specifies the second byte range as parameters of a URL directed to said file.

20. A system comprising:
a first server comprising storage caching a first byte range of a file;
a second server comprising storage caching a second non-overlapping byte range of the file;
a third server comprising:
one or more processors configured to:
receive a client request that is directed to the file from a client device;
generate, from the client request, a first subrequest directed to the first byte range of the file, and a second subrequest directed to the second byte range of the file that does not overlap with the first byte range, wherein the first subrequest and the second subrequest comprise at least one of a different header or Uniform Resource Locator (URL) than the client request received from the client device;
route, to the first server, the first subrequest directed to the file and the first byte range of the file instead of the client request, wherein the first server serves the first byte range of the file directly to the client device in response to receiving the first subrequest;
route, to the second server, the second subrequest directed to the file and the second byte range of the file instead of the client request, and wherein the second server directly serves the second byte range of the file to the client device in response to receiving the second subrequest.

* * * * *